United States Patent [19]
Kugio et al.

[11] Patent Number: 6,070,482
[45] Date of Patent: Jun. 6, 2000

[54] GEAR MODULE

[75] Inventors: Mitsuyasu Kugio; Takashi Kasahara; Toshinori Hijiya; Masaaki Takagi, all of Itabashi-ku, Japan

[73] Assignee: Nidec Copal Corporation, Tokyo, Japan

[21] Appl. No.: 09/061,938

[22] Filed: Apr. 17, 1998

[30] Foreign Application Priority Data

Apr. 21, 1997 [JP] Japan ................................. 9-103470
Aug. 12, 1997 [JP] Japan ................................. 9-217545

[51] Int. Cl.$^7$ ............................................ F16H 3/34
[52] U.S. Cl. ............................ 74/354; 74/384; 74/406; 74/421 A
[58] Field of Search .................. 74/384, 354, 406, 74/421 A

[56] References Cited

U.S. PATENT DOCUMENTS

| | | | |
|---|---|---|---|
| 3,168,840 | 2/1965 | Williams | 74/354 X |
| 3,487,707 | 1/1970 | Kortan | 74/384 |
| 3,601,234 | 8/1971 | Ingraham | 74/354 X |
| 3,854,670 | 12/1974 | Bertolazzi | 74/354 X |
| 3,938,437 | 2/1976 | Punater | 74/354 X |
| 4,347,009 | 8/1982 | Brown | 74/354 X |
| 4,383,778 | 5/1983 | Costa | 74/354 X |
| 4,690,195 | 9/1987 | Taylor | 74/354 X |
| 4,843,903 | 7/1989 | Tanaka et al. | 74/354 |
| 4,970,561 | 11/1990 | Mizuno | 74/354 X |
| 5,016,493 | 5/1991 | Han | 74/413 X |
| 5,031,471 | 7/1991 | Watanabe | 74/354 |
| 5,094,116 | 3/1992 | Shintani | 74/354 |
| 5,213,426 | 5/1993 | Ewing | 74/354 X |
| 5,273,480 | 12/1993 | Suto | 74/354 X |
| 5,419,543 | 5/1995 | Nakamura et al. | 74/354 X |
| 5,643,120 | 7/1997 | Murashima et al. | 74/354 X |
| 5,697,263 | 12/1997 | Funahashi et al. | 74/354 X |
| 5,740,696 | 4/1998 | Jean et al. | 74/354 |

FOREIGN PATENT DOCUMENTS

| | | |
|---|---|---|
| 60-14551 | 8/1985 | Japan . |
| 08138299 | 5/1996 | Japan . |

*Primary Examiner*—Tamara L. Graysay
*Assistant Examiner*—Brandon C. Stallman
*Attorney, Agent, or Firm*—Hickman Stephens Coleman & Hughes, LLP

[57] ABSTRACT

There is disclosed a gear module comprising an output gear pivotally fitted to a base, a transmission gear rotated by a driving force from a driving motor to transmit the driving force to the output gear, a power actuating lever having a base end pivotally fitted to the base to be rotated around the base end; an actuated lever having a top end pivotally fitted to the transmission lever and a base end pivotally fitted to the base; and a connection bar connecting the top end of the power actuating lever and the top end of the actuated lever, the connection bar allowing the actuated lever to rotate in accordance with a rotation of the power actuating lever and allowing the transmission gear and the output gear to be engaged with each other, wherein the link axises of the power actuating lever and the connection bar form approximately a straight line when the transmission lever is engaged with the output gear.

3 Claims, 7 Drawing Sheets

GEAR MODULE

BACKGROUND OF THE INVENTION

1. Field of the Invention

The present invention relates to a gear module capable of securely coupling a transmission gear and a output gear.

2. Related Background Art

For such related arts, the arts disclosed in Japanese Patent Application Laid Open No. 60-145551 and No. 8-138299 have been known. For example, as shown in FIGS. 7A and 7B, the conventional gear module 20 comprises the gear 21 rotated by a driving force of a driving motor; the lever 22 capable of rotating around a shaft of the gear 21; and the gear 23 which is pivotally fitted to the top of the lever 22 to be engaged with the gear 21. Moreover, the gear module 20 comprises a pair of gears 24 and 25 which are disposed on both sides of the lever 22, respectively, to be selectively engaged with the gear 23.

The rotation direction of the gear 23 is changed in accordance with which gear of the gears 24 and 25 the gear 23 engages with. Specifically, when the gear 23 engages with the gear 24, the gear 23 is allowed to rotate counter-clockwise (see FIG. 7A). On the other hand, when the gear 23 engages with the gear 24, the gear 23 is allowed to rotate clockwise (see FIG. 7B). For this reason, in which direction the gear 23 may rotate, a force is applied in the direction where the gears are engaged strongly, and the gear 23 never fails to engage with the gears 24 and 25.

However, the conventional gear module 20 has been forced to reverse the rotation direction of the driving motor every time when engaging of the gear 23 with the gears 24 and 25 is switched, resulting in complexity of the motor control circuit for controlling the rotation of the driving motor. Here, if the driving motor is allowed to rotate only in the designated one direction, the structure of the motor control circuit becomes simple. However, with such structure of the conventional gear module 20, when the driving motor is rotated, for example, so as to rotate the gear 23 clockwise shown in FIG. 7B, a force acts in the direction on contacting of the gears 23 and 24, and accordingly the gears 23 and 24 come off from each other. The gears 23 and 24 come to weakly engage with each other.

Moreover, since the conventional gear module 20 switches the gear by suddenly reversing the rotation of the gear, a large load is applied to each gear, resulting in a low durability (or reliability) of the module 20. Here, when another actuator is provided additionally and the lever 22 is swung by the driving force of this actuator, the load applied on the gear can be reduced. However, according to this method, the lever 22 must be swung in opposition to a pressing force due to engaging of the gears. Therefore, the load applied to the actuator is excessive.

SUMMARY OF THE INVENTION

The object of the present invention is to provide a gear module which is capable of allowing the gears to be engaged with each other with a sufficient force even when a driving motor is rotated only in one direction.

Another object of the present invention is to provide a gear module which is capable of swinging a lever with a small force, thereby applying no excessive load on an actuator.

A gear module of the present invention comprises an output gear pivotally fitted to a base; and a transmission gear rotated by a driving force from a driving motor to transmit it to the output gear, the gear module further comprises a power actuating lever having a base end pivotally fitted to the base to be rotated around the base end; an actuated lever having a top end pivotally fitted to the transmission lever and a base end pivotally fitted to the base; and a connection bar connecting the top end of the power actuating lever and the top end of the actuated lever, the connection bar allowing the actuated gear to rotate in accordance with the rotation of the power actuating lever and allowing the transmission gear and the output gear to be engaged with each other, wherein the power actuating lever and the connection bar form approximately a straight line when the transmission lever is engaged with the output gear.

When such construction is adopted, the power actuating lever and the actuated lever moves in association with each other by the connection bar. Therefore, upon rotation of the power actuating lever, the actuated lever rotates in accordance with the rotation of the power actuating lever. When the actuated lever rotates and the top end thereof moves toward the output gear, the transmission gear pivotally fitted to the top end of the actuated lever is engaged with the output gear. At this time, a force may act on the power actuating lever by the rotation load of the output gear in a direction where the transmission gear comes to separate from the output gear. However, since the power actuating lever and the connection bar form approximately a straight line when the transmission gear is engaged with the output gear, this force acts onto the straight line formed by the power actuating lever and the connection bar. Therefore, since this force does not act in the direction where the power actuating lever is rotated, the transmission gear never comes off from the output gear. As a result, the transmission gear and the output gear keep their engagement state.

Moreover, in the present invention, the power actuating lever comprises an elastic member which energizes the power actuating lever in a gear releasing direction to separate the transmission gear from the output gear; and an actuator which rotates the power actuating lever in a direction opposite to the gear releasing direction in opposition to an energizing force of the elastic member, wherein when application of a current to the actuator is stopped, the power actuating lever is separated from the output gear by the energizing force of the elastic member.

When such constitution is adopted, upon application of a current to the actuator, the power actuating lever rotates in a direction opposite to the gear releasing direction and the actuated lever in association with the power actuating lever also rotates. Then, the transmission gear pivotally fitted to the top end of the actuated lever is engaged with the output gear, whereby a driving force of the transmission gear is transmitted to the output gear. As a result, the output gear starts to rotate. Thereafter, when the application of the current to the actuator is stopped, the power actuating lever rotates in the gear releasing direction by the energizing force of the elastic member, whereby the transmission gear is separated from the output gear. As a result, the output gear stops to rotate. As described above, when the application of the current to the actuator is stopped by an occurrence of a unexpected power failure and the like, the transmission gear is automatically separated from the output gear, so that locking of the output gear is released. Therefore, an occurrence of the situation can be avoided, in which because of the lock of the output gear a driving mechanism driven by the output gear can not move keeping its driving state.

Moreover, in the above described present invention, a second output gear is further provided, which is pivotally fitted to the base and disposed in a direction opposite to the output gear relative to the transmission gear, the second output gear being engaged with the transmission gear separated from the output gear, and the transmission gear is selectively engaged either with the output gear or with the second output gear in accordance with the rotation of the actuated lever.

When such constitution is adopted, the transmission gear can be selectively engaged either with the output gear or with the second output gear in accordance with the rotation of the actuated lever, whereby the two output gears can be driven by a single driving motor. As a result, the number of parts can be reduced and a reduction in cost can be achieved.

A gear module according to the present invention comprises an input gear which rotates by a driving force of a driving motor; and an output gear which rotates in accordance with the rotation of the input gear, and the gear module further comprises a swing lever having a base end pivotally and concentrically fitted to the input gear, the swing lever rotating around the base end; and a transmission gear which is pivotally fitted to an free end of the swing lever and engaged normally with the input gear, the transmission gear being engaged with the output gear when the free end of the swing lever rotates toward the output gear and transmitting a rotation force of the input gear to the output gear, wherein an action line of the input gear and the transmission gear is approximately in parallel with that of the transmission gear and the output gear.

When such constitution is adopted, upon rotation of the free end of the swing lever toward the output gear, the transmission gear and the output gear are engaged with each other. Since the input gear and the transmission gear are normally engaged with each other, the rotation force of the input gear is transmitted to the output gear through the transmission gear, and the output gear rotates.

Here, each gear is disposed in order that the action line of the input gear and the transmission gear is approximately in parallel with that of the transmission gear and the output gear. Therefore, a pushing force of the input gear to the transmission gear and the pushing force of the output gear to the transmission gear cancel each other, so that no force to change the position of the transmission gear is exerted. As a result, by simply applying a small force to the swing lever, the free end of the swing lever rotates toward the opposite side to the output gear and the engagement of the transmission gear with the output gear is released.

Moreover, based on a reference line perpendicular to a center line of the input gear and the transmission gear, assuming that an angle of a tangent line of the transmission gear and the output gear relative to the reference line be $\alpha$, and an angle of a movement direction of a contact point of the transmission gear and the output gear relative to the reference line be $\beta$ when the contact point starts to move by the rotation of the swing lever, the angle $\beta$ is small than the angle $\alpha$.

With adoption of such constitution, when the free end of the swing lever start to rotate toward an opposite side to the output gear, the angle $\beta$ of the movement direction of the contact point of the transmission gear and the output gear relative to the reference line is smaller than the angle $\alpha$ of the tangent line of the transmission gear and the output gear relative to the reference line. Therefore, when the transmission gear starts to move by the rotation of the swing lever, the transmission gear is never interfered by the output gear and the engagement of the transmission gear with the output gear is smoothly released.

Moreover, the gear module of the present invention further comprises an energizing member which energizes the swing lever in a direction so as to separate the free end of the swing lever from the output gear; and a lever driving portion which rotates the free end of the swing lever toward the output gear in opposition to the energizing force of the energizing member.

With adoption of such constitution, when the lever driving portion is driven, the free end of the swing lever rotates toward the output gear, and the transmission gear and the output gear are engaged with each other. Therefore, the rotation force of the input gear is transmitted to the output gear through the transmission gear, and the output gear starts to rotate. Moreover, when the lever driving portion stops driving, only the energizing force of the energizing member is applied to the free end of the swing lever, and the free end of the swing lever rotates in a direction where the free end separates from the output gear. For this reason, the engagement of the transmission gear and the output gear is released, and the rotation of the output gear is stopped.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Preferred embodiments of a gear module according to the present invention will be described with reference to the accompanying drawings below.

Figure 1:
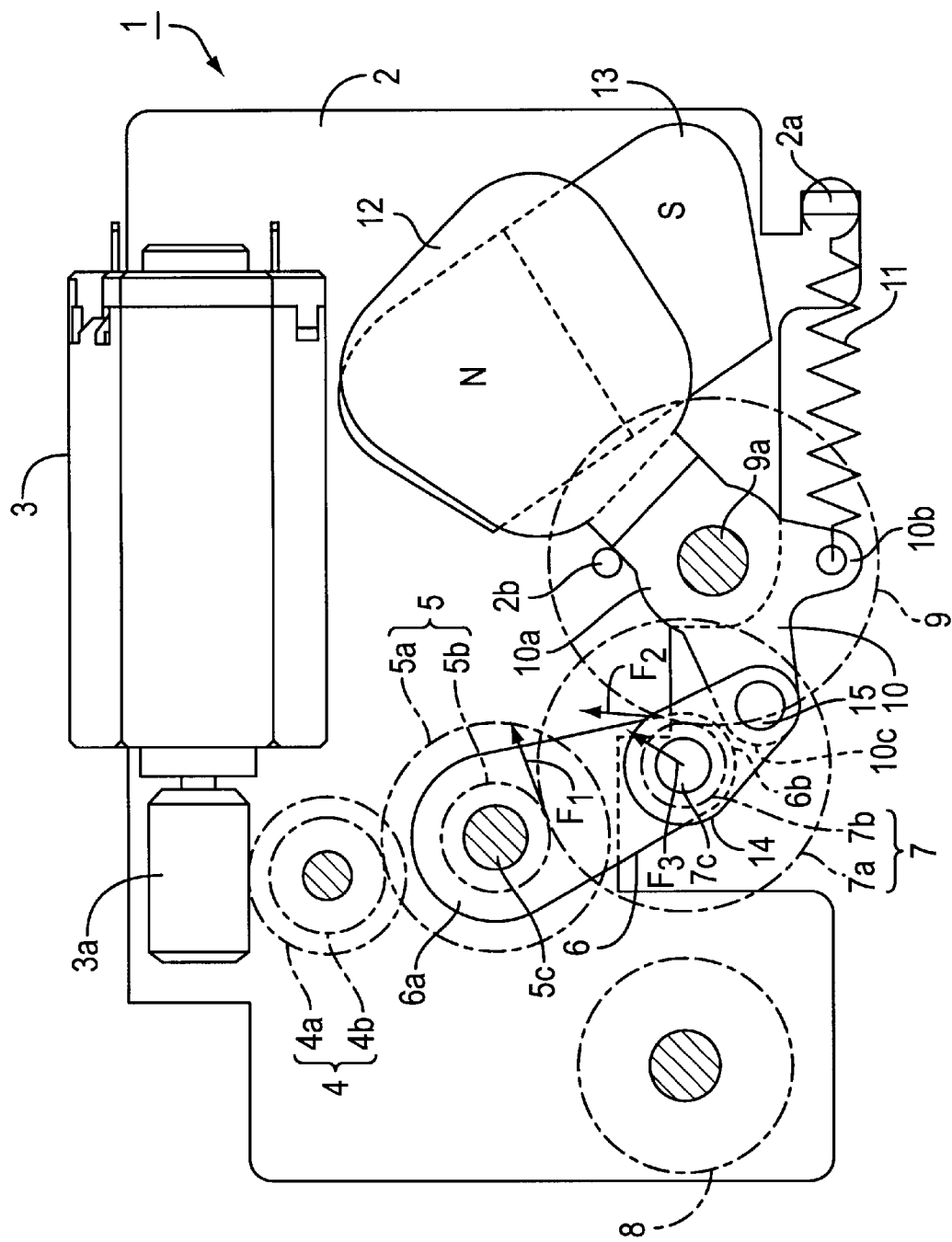
FIG. 1 is a plan view showing one status of a first embodiment of a gear module according to the present invention.
Figure 2:
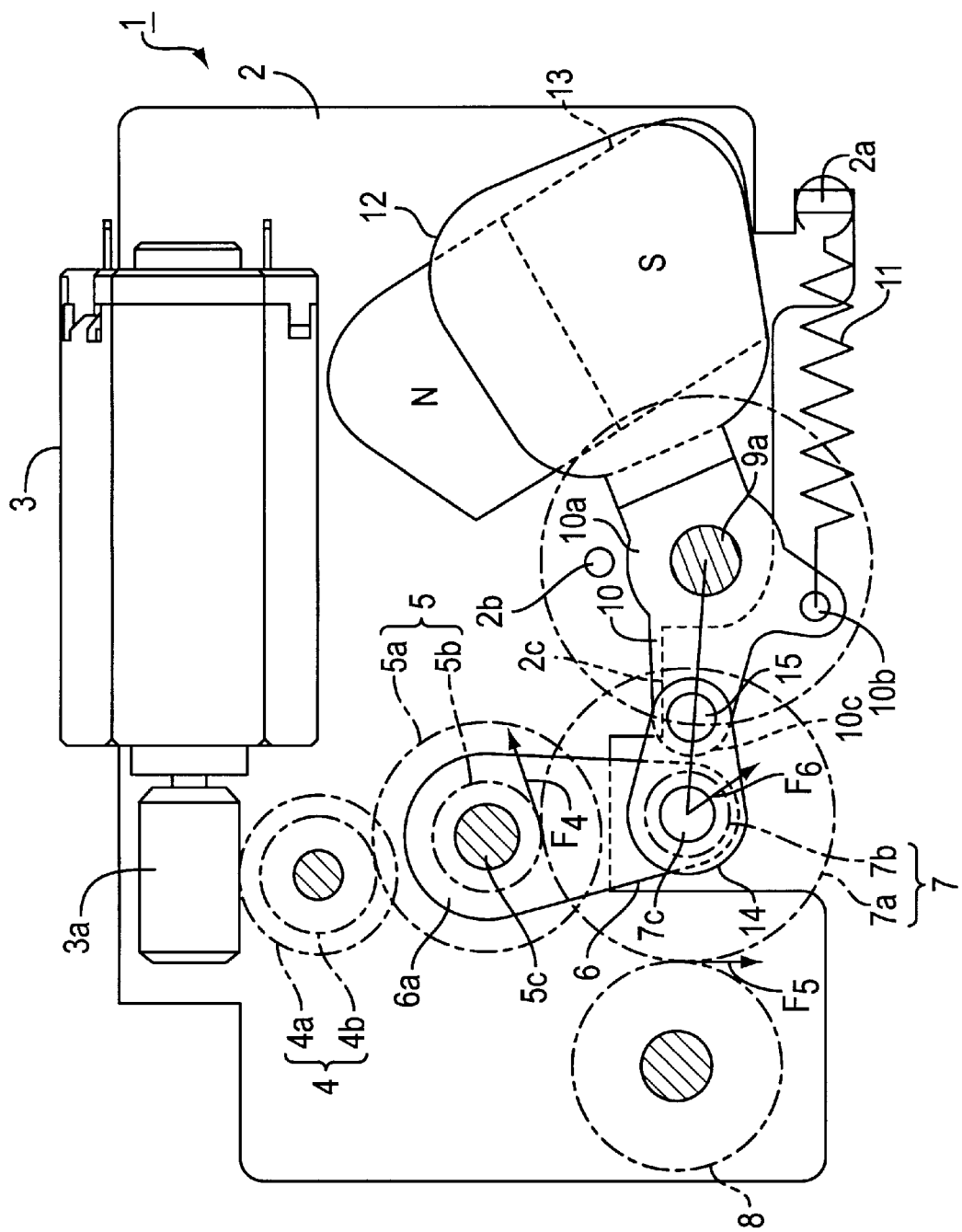
FIG. 2 is a plan view showing another status of the first embodiment shown in FIG. 1.

FIGS. 1 and 2 are respectively plan views showing two status of the gear module 1 of the first embodiment of the present invention. As shown in FIGS. 1 and 2, the gear module 1 comprises a rectangular base 2, on which the driving motor 3 is disposed. The worm gear 3a is fixed to the rotation shaft of the driving motor 3, and the gear 4 composed of a large diameter gear portion 4a and the small diameter gear portion 4b is pivotally fitted onto the base 2 adjacent to the worm gear 3a. Moreover, the gear 5 composed of the large diameter gear portion 5a and the small diameter gear portion 5b is pivotally fitted onto the base 2 adjacent to the gear 4. Furthermore, the base end 6a of the actuated lever 6 is pivotally fitted to the gear shaft 5c of the gear 5, and the transmission gear 7 composed of the large diameter gear portion 7a and the small diameter gear portion 7b is pivotally fitted to the top end 6b of the actuated lever 6.

The large diameter gear portion 4a of the gear 4 is engaged with the worm gear 3a, and the large diameter gear portion 5a of the gear 5 is engaged with the small diameter portion 4b of the gear 4. At the same time, the large diameter gear portion 7a of the transmission gear 7 is engaged with the small diameter gear portion 5b of the gear 5, whereby the driving force of the driving motor 3 can be transmitted to the transmission gear 7 while lowering the rotation speed of the driving motor 3.

Onto the portions on the base 2 interposing the transmission gear 7, pivotally fitted are the first output gear (output gear 8) and the second output gear 9. The actuated lever 6 is rotated around its base end 6a, whereby the transmission gear 7 can be selectively engaged either with the first output gear 8 or with the second output gear 9.

The base end 10a of the power actuating lever 10 is pivotally fitted to the gear shaft 9a of the second output gear 9, and the spring fixing piece 10b extending in a lateral direction is provided in the base end 10a of the power actuating lever 10. The spring fixing piece 2a is provided on the portion of the base 2 extending from the base end 10a of the power actuating lever 10, and the coil spring (elastic member) 11 is fitted between the spring fixing pieces 2a and 10b. For this reason, the power actuating lever 10 rotates counterclockwise around the gear shaft 9a by an energizing force produced by the coil spring 11. The actuator 12 is provided in the base end 10a of the power actuating lever 10. A voice coil motor constituted by a moving coil is used as the actuator 12. The voice coil motor is constituted of an air-core coil. In the air-core coil, a current flows through the coil disposed between a upper yoke (not shown) and the magnet 13 arranged in the base 2, so that an electromagnetic force (F=I×B×L) acts on the coil, which acts on an electric conductor of an effective length L in a magnetic flux density B caused by the magnet, and the power actuating lever 10 rotates clockwise around the gear shaft 9a in opposition to the energizing force of the coil spring 11.

The top end 10c of the power actuating lever 10 and the top end 6b of the actuated lever 6 are connected by the connection bar 14. Specifically, the connection shaft 15 is provided in the top end 10c of the power actuating lever 10, and one end of the connection bar 14 is pivotally fitted to this connection shaft 15. Moreover, the other end of the connection bar 14 is pivotally fitted to the gear shaft 7c of the transmission gear 7, which is provided in the top end 6b of the actuated lever 6. A link mechanism having three set pairs and four shafts and the three set links are a pair of the gear shaft 5c of the input gear 5 and the gear shaft 7c of the transmission gear 7, a pair of the gear shaft 9a of the second output gear 9 and the connection shaft 15 of the power actuating lever 10 and a pair of the gear shaft 7c of the transmission gear 7 and the connection shaft 15 of the power actuating lever 10, is provided. As a result, the actuated lever 6 rotates in accordance with the rotation of the power actuating lever 10, so that the transmission gear 7 pivotally fitted to the top end 6b of the actuated lever 6 swings between the first output gear 8 and the second output gear 9.

Next, an operation of the gear module 1 will be described. First, in the state where the actuator 12 is not energized, the power actuating lever 10 is applied only with an energizing force of the coil spring 11. Therefore, as shown in FIG. 1, the power actuating lever 10 rotates counterclockwise and the power actuating lever 10 stops its rotation when the base end 10a of the power actuating lever 10 comes to touch the engaging piece 2b provided on an edge of the base 2. The top end 6b of the actuated lever 6 is pulled by the power actuating lever 10 via the connection bar 14, and the actuated lever 6 also rotates counterclockwise. Accordingly, the transmission gear 7 swings toward the second output gear 9, and the transmission gear 7 and the second output gear 9 are engaged with each other.

When the driving motor 3 starts its driving in this state, the gear 4 engaged with the worm gear 3a rotates clockwise, whereby the gear 5 engaged with the gear 4 rotates counterclockwise. Upon rotation of the gear 5, the transmission gear 7 engaged with the gear 5 rotates clockwise, whereby the second output gear 9 engaged with the transmission gear 7 rotates counterclockwise. As a result, a second outputting portion (not shown) connected to the second output gear 9 start its operation by the drive of the second output gear 9.

When the rotation load is produced at the second output gear 9 by the load at the second outputting portion, the resultant force F3 of the driving force F1 of the driving motor 3 and the force F2 due to the load of the second outputting portion is applied to the transmission gear 7. The driving force F1 is applied to the transmission gear 7 from the driving motor 3 via the gears 4 and 5. On the other hand, the force F2 due to the load of the second outputting portion is applied to the transmission gear 7 via the second output gear 9. By this resultant force F3, the actuated lever 6 is energized so as to rotate counterclockwise, whereby the transmission gear 7 and the second output gear 9 come to be strongly engaged with each other. Therefore, the transmission gear 7 never comes off from the second output gear 9.

Next, when the actuator 12 is energized, the power actuating lever 10 rotates clockwise in opposition to the energizing force of the coil spring 11, and the power actuating lever 10 stops its rotation when the connection shaft 15 of the power actuating lever 10 touches the notched engaging portion 2c provided in the center of the base 2 as shown in FIG. 2. The top end 6b of the actuated lever 6 is pushed by the power actuating lever 10 via the connection bar 14, and the actuated lever 6 also rotates clockwise. Therefore, the transmission lever 7 swings toward the first output gear 8. When the transmission gear 7 and the first output gear 8 are engaged with each other, the power actuating lever 10 and the connection bar 14 form approximately a straight line. When the driving motor 3 starts its driving in this state, the gear 4 engaged with the worm gear 3a, the gear 5 and the transmission gear 7 rotate respectively, whereby the first output gear 8 engaged with the transmission gear 7 rotates counterclockwise. As a result, a first outputting portion (not shown) connected to the first output gear 8 starts its operation by the driving of the first output gear 8.

Here, in the case where the load of the first outputting portion produces a rotation load at the first output gear 8, the resultant force F6 of the driving force F4 of the driving motor 3 and the force F5 of the load of the first outputting portion is applied to the transmission gear 7. The driving force F4 of the driving motor 3 is applied to the transmission gear 7 via the gears 4 and 5, and the force F5 of the load of the first outputting portion is applied to the transmission gear 7 via the first output gear 8. By this resultant force F6, the actuated lever 6 is energized so as to rotate counterclockwise. Therefore, a force acts on the transmission gear 7 in a direction (gear disengaging direction) where the transmission gear 7 comes off from the first output gear 8. However, as described above, since the power actuating lever 10 and the connection bar 14 form approximately the straight line, the connection shaft 15 is positioned on the straight line connecting the gear shaft 7c and the gear shaft 9a. For this reason, the resultant force F6 is applied to the connection shaft 15 in a direction (a direction of the gear shaft 9a) where the power actuating lever 10 extends, so that the power actuating lever 10 never rotates by the resultant force F6. Therefore, the transmission gear 7 and the first output gear 8 are kept in their engagement state.

Figure 3:
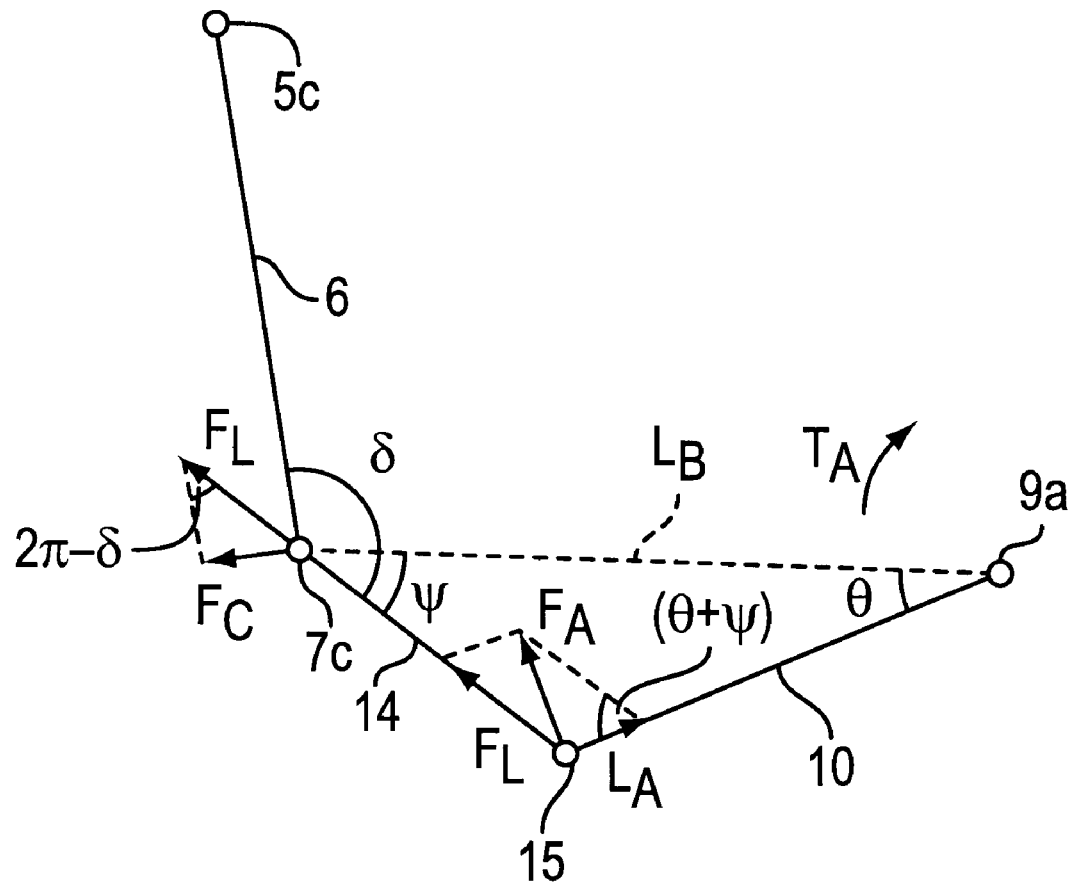
FIG. 3 is a schematic view for explaining how forces are applied to a power actuating lever, an actuated lever and a connection bar in the first embodiment.

Next, the description on how to apply the force to the power actuating lever 10, the actuated lever 6 and the connection bar 14 will be described in detail. As shown in FIG. 3, assuming that the interval between the gear shaft 7c and the connection shaft 15, which is a length in a direction to which the power actuating lever 10 extends, be LA, and the torque applied to the power actuating lever 10 be TA, the force FA in the rotation direction on the connection shaft 15 is given by the equation (1).

$$FA = TA/LA \quad (1)$$

Assuming that the angle formed by an axis (line connecting a center of the gear shaft 9a with a center the connection shaft 15) of the power actuating lever 10 and the line LB is $\Theta$ and the angle formed by the line connecting the center of the connection shaft 15 with a center of the gear shaft 7c and the line LD is $\psi$, the force FL of the power actuating lever 10 to push the connection bar 14 is given by the equation (2).

$$FL = FA/\sin(\Theta+\psi) \quad (2)$$

Moreover, assuming that an angle formed by a link axis of the connection bar 14 (a line connecting a center of the gear shaft 7c with a center of the connection shaft 15) and a link axis of the actuated lever 6 (a line connecting a center axis of the gear shaft 5c with the center axis of the gear shaft 7c) is $\delta$, a force FC with which the actuated lever 6 is rotated toward the first output gear 8 is given by the equation (3).

$$FC = FL \cdot \sin(2\pi-\delta) = FL \cdot \sin\delta \quad (3)$$

Therefore, from the equations (1) to (3), the force FC can be obtained as follows.

$$FC = (TA \cdot \sin\delta)/(LA \cdot \sin(\Theta+\psi))$$

Accordingly, when the three rotation shafts, that is, the link axises of the gear shafts 7c and 9a and connection shaft 15, are substantially on the straight line, $\Theta \approx \psi \approx 0$ is satisfied, and the force FC is very large. For this reason, the resultant force F6 acting on the transmission gear 7 in the direction of the gear release, which is produced by the rotation load of the first output gear, is cancelled by the force FC acting in the reverse direction to the gear release direction. As a result, the engagement state of the transmission gear 7 with the first output gear 8 can be kept only by the force of the actuator 12.

It should be noted that the position of the center of the connection shaft 15 may be shifted slightly with respect to the straight line connecting the centers of the gear shafts 7c and 9a toward the gear shaft 5c side. Also in this case, since the rotation of the connection shaft 15 is fixed to the notch engagement portion 2c while touching the notch engagement portion 2c, the transmission gear 7 is never pushed back, whereby the engagement state of the transmission gear 7 with the first output gear 8 is never released.

Next, an example of application of the gear module 1 to a flexible disk drive will be described. In this example, a loading operation for the disk is carried out by utilizing the driving force of the second output gear 9 of the gear module 1. A releasing operation for the head protection member is carried out by utilizing the driving force of the first output gear 8 of the gear module 1. Here, the head protection member serves to allow a head to shunt from a disk, so that the head does not touch the disk. Moreover, the releasing operation for the head protection member is the one in which the head protection member is moved so as to release the shunt of the head and make the head freely movable.

Concretely, when a disk cartridge is first inserted to a driving apparatus, the disk is absorbed to the spindle motor by the well known chucking mechanism and an injection spring is charged. Subsequently, the driving motor 3 is driven in the state where the actuator 12 is not energized, and the second output gear 9 is rotated via the worm gear 3a, the gear 4, the gear 5 and the transmission gear 7. By this rotation of the second output gear 9, an ejection member is set to a predetermined position in the state where the injection spring is charged.

Thereafter, when the actuator 12 is energized, the power actuating lever 10 rotates clockwise around the gear shaft 9a in opposition to the coil spring 11, and the transmission gear 7 and the first output gear 8 are engaged with each other, whereby the engagement of them changes to the state of FIG. 2. In this state shown in FIG. 2, the driving motor 3 is driven and the first output gear 8 is rotated, whereby the head protection member moves to release the shunt of the head. Thereafter, since the engagement state of the transmission gear 7 and the first output gear 8 is kept in spite of stopping application of the current to the driving motor 3, the head protection member remains in the state where it comes off from the head and the head keeps the state where it may be able to contact the disk. Thus, the head comes to be movable, and data is enabled to be read out from the disk and written thereto.

Next, when supplying of the current to the actuator 12 is stopped, a VCM and the power actuating lever 10 rotate counterclockwise by a restoring force of the coil spring 11, so that the transmission gear 7 comes off from the first output gear 8. Therefore, the head protection member returns to the original position quickly, thereby shunting the head from the disk. Then, when the output gear 9 connected to the driving motor 3 rotates by a specified quantity by the motor 3, the disk comes to separate from the spindle motor and, at the same time, the disk is ejected to the outside by the restoring force of the ejection spring.

If the supplying of the current to the actuator 12 is stopped, the transmission gear 7 is separated from the first output gear 8 by the energizing force of the coil spring 11, thereby making the first output gear 8 free. Therefore, the head protection member restores to the original position and the head is shunted from the disk. As described above, since the head protection member first permits the head to shunt from the disk though the power source is suddenly cut off by a stoppage of electric power during accessing to the disk, it can be prevented the disk from being damaged.

The gear module of this embodiment is constructed as described above, so that the following effects can be achieved.

Specifically, in the case where the transmission is engaged with the output gear, the power actuating lever and the connection bar form approximately the straight line, the force exerted by the rotation load of the output gear is applied onto the straight line formed by the power actuating lever and the connection bar. Therefore, since this force does not act in the direction to rotate the power actuating lever, the transmission lever never comes off from the outputting lever. As a result, the transmission gear and the output gear keep the state where they are engaged with each other.

Second Embodiment

Figure 4:
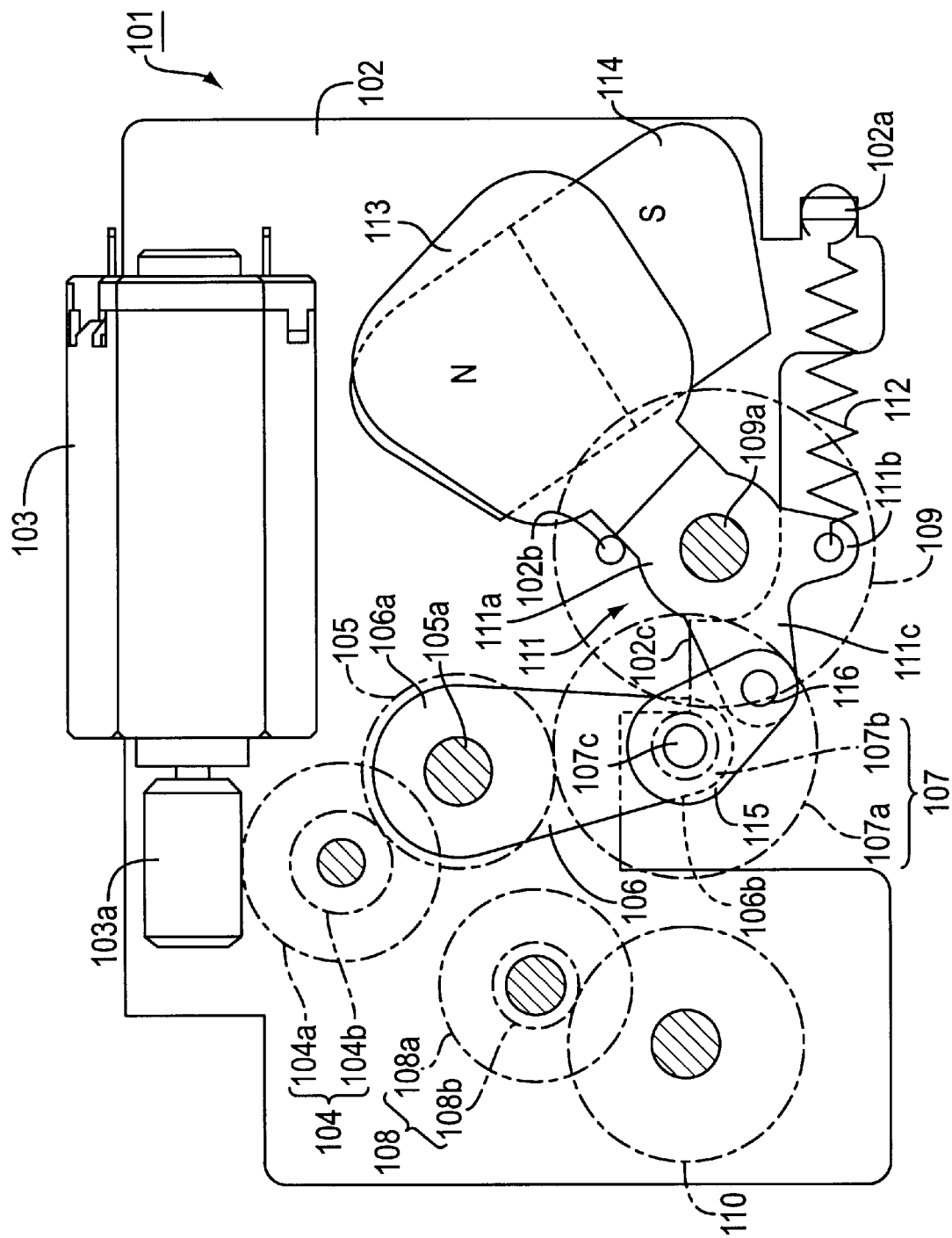
FIG. 4 is a plan view showing one status of a gear module of the second embodiment of the present invention.
Figure 5:
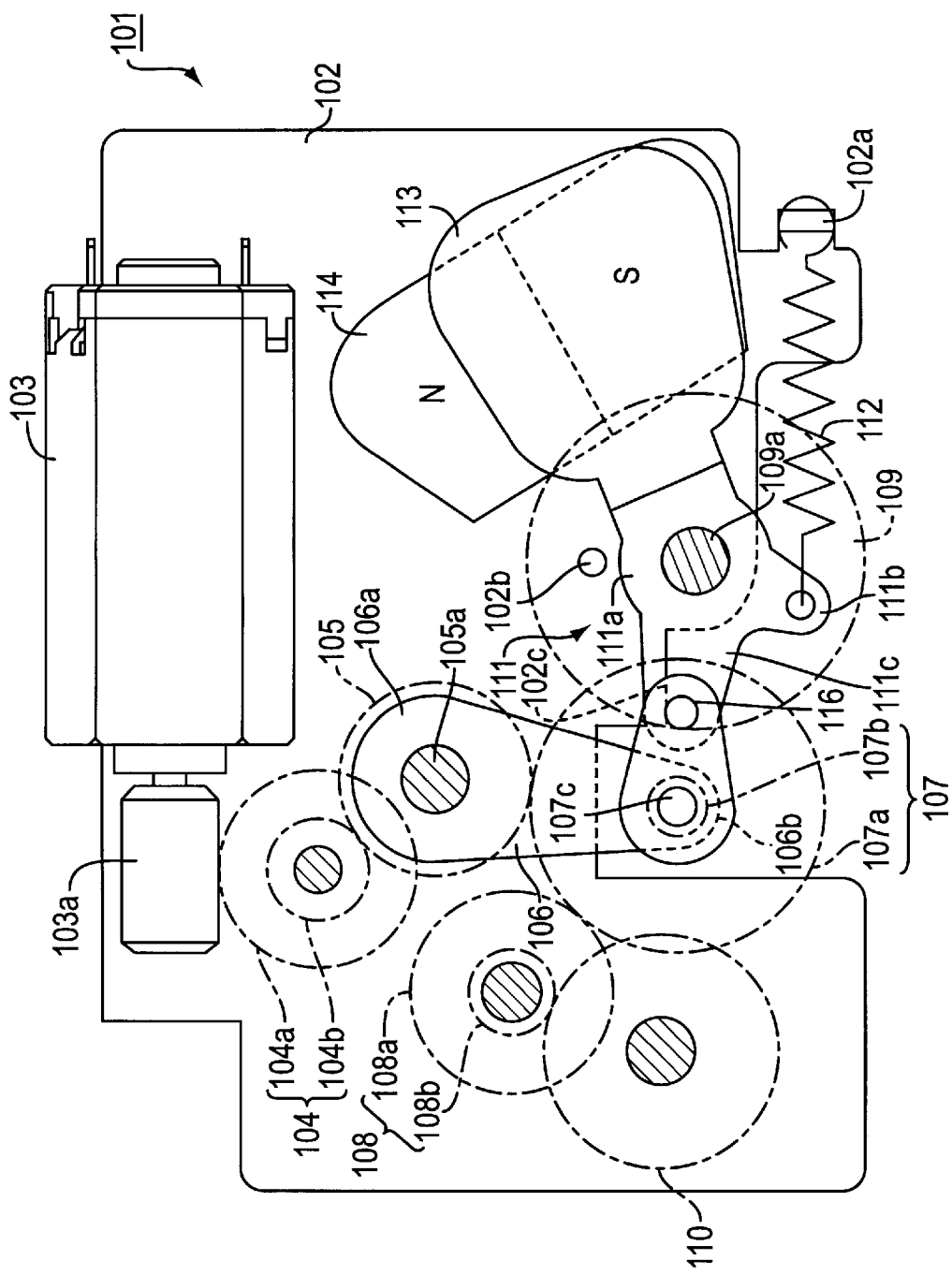
FIG. 5 is a plan view showing another status of the gear module of the second embodiment shown in FIG. 4.

FIGS. 4 and 5 are respectively plan views showing two status in the gear module 101 of a second embodiment according to the present invention. As shown in FIGS. 4 and 5, the gear module 101 comprises a rectangular base 102, on which the driving motor 103 is arranged. The worm gear 103a is fixed to the rotation shaft of the driving motor 103, and the gear 104 composed of the large diameter gear portion 104a and the small diameter gear portion 104b is pivotally fitted onto the portion of the base 102 adjacent to the worm gear 103a. The input gear is pivotally fitted to the portion of the base adjacent to the gear 104. Moreover, the base end 106a of the actuated lever (swing lever) 106 is pivotally fitted to the gear shaft 105a of the input gear 105, and the transmission gear 107 composed of the large diameter gear portion 107a and the small diameter gear portion 107b is pivotally fitted to the free end 106b of the actuated lever 106.

The large diameter gear portion 104a of the gear 104 is engaged with the worm gear 103a, and the input gear 105 is engaged with the small diameter gear portion 104b of the gear 104. Moreover, the larger diameter gear portion 107a of the transmission gear 107 is engaged with the input gear 105, whereby the driving force of the driving motor 103 can be transmitted to the transmission gear 7, while reducing the rotation speed of the driving motor 103.

The first output gear (output gear 108) composed of the large diameter gear portion 108a and the small diameter gear portion 108b, and the second output gear 109 are pivotally fitted onto the base interposing the transmission gear 107. By swinging the actuated lever 106 around its base end 106a, either the large diameter gear portion 108a of the first output gear 108 or the second output gear 109 can be selectively engaged with the transmission gear 107.

The gear 110 with which the small diameter gear portion 108b of the first output gear 108 is engaged is pivotally fitted onto the portion of the base 102 adjacent to the first output gear 108. Moreover, the base end 111a of the power actuating lever 111 is pivotally fitted to the gear shaft 109a of the second output gear 109, and the spring fixing piece 111b extending toward the side of the power actuating lever 111 is provided in the base end 111a thereof. The spring fixing piece 102a is provided on the portion of the base 102 extended from the base end 111a of the power actuating lever 111, and the coil spring (energizing member) 112 is fitted between the spring fixing pieces 102a and 111b. Therefore, the energizing force of the coil spring 112 allows the power actuating lever 111 to swing counterclockwise around the gear shaft 109a. The actuator (lever driving portion) 113 is provided in the base end 111a of the power actuating lever 111. A voice coil motor composed of a moving coil is used for the actuator 113. The voice coil motor is composed of an air-core coil. In the air-core coil, a current flows through the coil disposed between a upper yoke (not shown) and the magnet 114 arranged in the base 102, so that an electromagnetic force (F=I×B×L) acts on the coil, which acts on an electric conductor of an effective length L in a magnetic flux density B caused by the magnet 114, and the power actuating lever 111 rotates clockwise around the gear shaft 109a in opposition to the energizing force of the coil spring 112.

The top end 111c of the power actuating lever 111 and the free end 106b of the actuated lever 106 are connected by the connection bar 115. Specifically, the connection shaft 116 is provided in the top end 111c of the power actuating lever 111, and one end of the connection bar 115 is pivotally fitted to this connection shaft 116. Moreover, the other end of the connection bar 115 is pivotally fitted to the gear shaft 107c of the transmission gear 107, which is provided in the free end 106b of the actuated lever 106. A link mechanism having three set links and four shafts and the three set links are a pair of the gear shaft 105c of the input gear 105 and the gear shaft 107c of the transmission gear 107, a pair of the gear shaft 109a of the second output gear 109 and the connection shaft 115 of the power actuating lever 110 and a pair of the gear shaft 107c of the transmission gear 107 and the connection shaft 115 of the power actuating lever 110, is provided. As a result, the actuated lever 106 swings in accordance with the swing of the power actuating lever 111, so that the transmission gear 107 pivotally fitted to the free end 106b of the actuated lever 106 is selectively engaged either with the first output gear 108 or with the second output gear 109.

Operation

Next, an operation of the gear module 101 will be described. First, in the state where the actuator 113 is not energized, an energized force of the coil spring 112 is alone applied to the power actuating lever 111. Therefore, the power actuating lever 111 rotates counterclockwise and the power actuating lever 111 stops its rotation when the base end 111a of the power actuating lever 111 comes to touch the engaging piece 102b provided on an edge of the base 102, as shown in FIG. 4. The free end 106b of the actuated lever 106 is pulled by the power actuating lever 111 via the connection bar 115, whereby the actuated lever 106 also swings counterclockwise. Accordingly, the transmission gear 107 moves toward the second output gear 109, and the transmission gear 107 and the second output gear 109 are engaged with each other.

When the driving motor 103 is driven in the positive direction in this state, the gear 104 engaged with the worm gear 103a rotates clockwise, whereby the gear 105 engaged with the gear 104 rotates counterclockwise. Upon rotation of the gear 105, the transmission gear 107 engaged with the gear 105 rotates clockwise, and the second output gear 109 engaged with the transmission gear 107 rotates counterclockwise. As a result, a second outputting portion (not shown) connected to the second output gear 109 starts its operation by the drive of the second output gear 109. Then, the operation of the second outputting portion is stopped by turning on a switch (not shown). Alternately, it is stopped by stopping the driving motor 3 after passage of time on sequence. Here, since the clockwise rotation force of the transmission gear 7 exerted by the rotation thereof acts so as to allow the transmission gear 107 to strongly engage with the second output gear 109, the second output gear 109 can stably be rotated counterclockwise.

Next, when the actuator 113 is energized, the power actuating lever 111 swings clockwise in opposition to the energizing force of the coil spring 112, and the power actuating lever 111 stops its swing when the connection shaft 116 of the power actuating lever 111 touches the notched engaging portion 102c provided in the center of the base 102 as shown in FIG. 5. The free end 106b of the actuated lever 106 is pushed by the power actuating lever 111 via the connection bar 115, whereby the actuated lever 106 also rotates clockwise. Therefore, the transmission lever 107 moves toward the first output gear 108 and the transmission gear 107 and the first output gear 108 are engaged with each other. When the transmission gear 107 and the first output gear 108 are engaged with each other, the power actuating lever 111 and the connection bar 115 form approximately a straight line. In this state, when the driving motor 103 starts its driving in opposite direction, the gears 104 engaged with the worm gear 103a, the gear 105 and the transmission gear 107 rotate, whereby the first output gear 108 engaged with the transmission gear 107 rotates counterclockwise. As a result, a first outputting portion (not shown) connected to the first output gear 108 via the gear 110 starts its operation by the drive of the first output gear 108.

Here, there is a fear that the engagement of the transmission gear 107 with the first output gear 108 may be released because of a poor precision or vibrations, shocks and the like added from the outside. However, as described above, the link axises of the power actuating lever 111 and the connection bar 115 form approximately the straight line, as a result, a center of the connection shaft 116 is positioned on the straight line which connects the gear shaft 107c and the gear shaft 109a. Therefore, the resultant force of the driving force of the driving motor 103 and the force due to the load of the first outputting portion is applied to the connection shaft in a direction (direction of the gear shaft) to which the power actuating lever 111 extends, whereby the power actuating lever 111 never rotates. The driving force of the driving motor is applied to the connection shaft from the driving motor 103 via the gears 104 and 105. On the other hand, the force due to the load of the first outputting portion is applied to the connection shaft via the first output gear 108. Therefore, the transmission gear 107 and the first output gear 108 keeps their engagement state.

Figure 6:
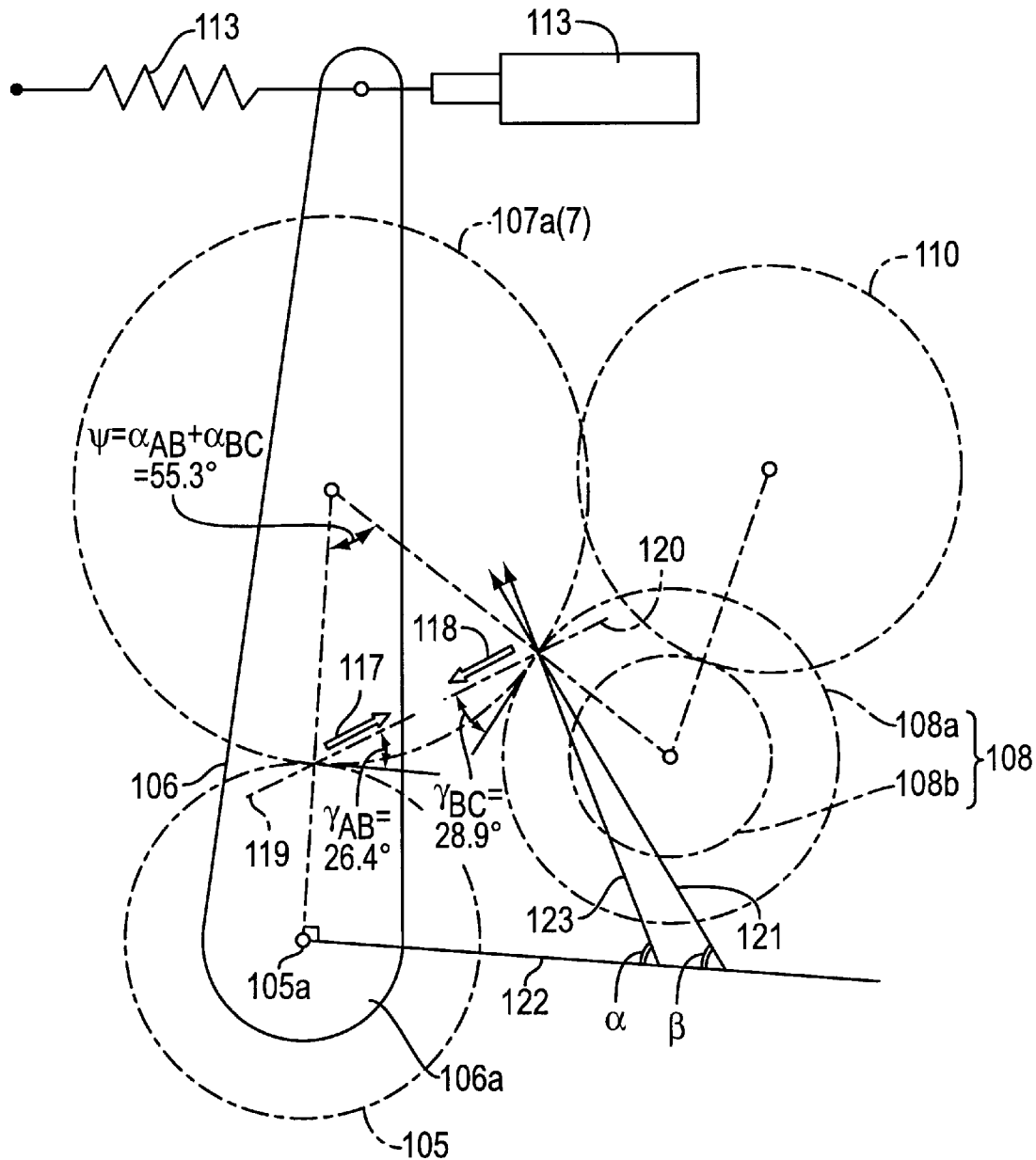
FIG. 6 is a drawing showing a relation between an arrangement of each gear and action lines in the second embodiment.
Figure 7A:
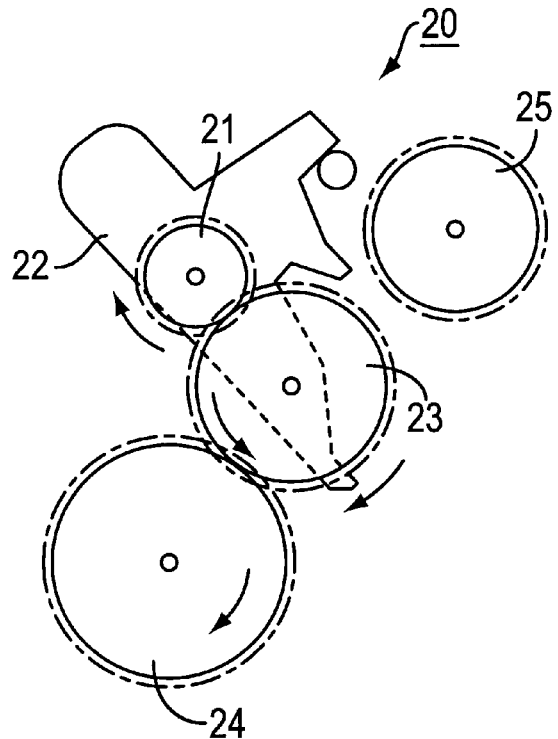
FIGS. 7A and 7B are plan views showing a conventional gear module.
Figure 7B:
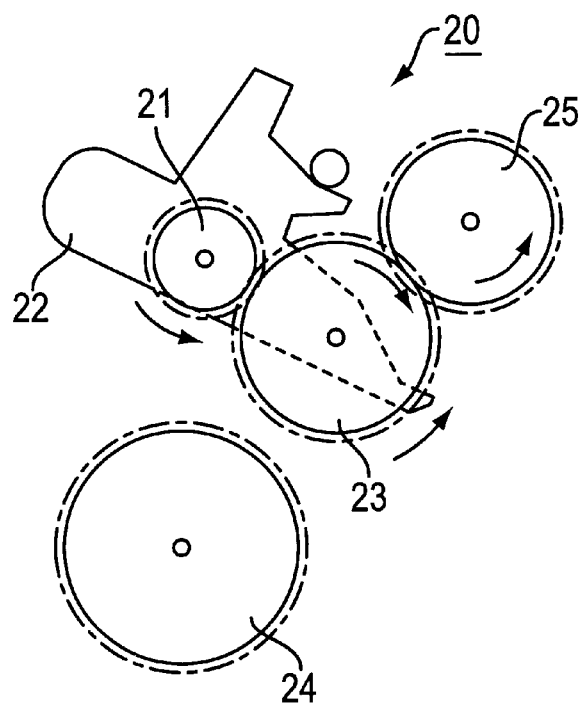

Next, when the actuator 113 is turned off, only the energizing force of the coil spring 112 is applied to the power actuating lever 111, and the power actuating lever 111 rotates counterclockwise. The actuated lever 106 also starts its rotation in accordance with the rotation of the power actuating lever 111. As shown in FIG. 6, in the state where the actuated lever 106 and the first output gear 108 are engaged with each other, the pushing force 117 exerted by the engagement with the input gear 105, as well as the pushing force 118 exerted by the engagement with the first output gear 108, is applied to the transmission gear 107 fitted pivotally to the actuated lever 106. Then, the magnitudes of the pushing forces 117 and 118 are equal to each other. Angles of the forces 117 and 118 is equal to an angle of the action line 119 of the input gear 105 and the transmission gear 107 and an angle of the action line 120 of the transmission gear 107 and the first output gear 108, respectively. Therefore, if the action lines 119 and 120 are approximately parallel, the two pushing forces 117 and 118 act so as to cancel each other, so that a force to allow the transmission gear 107 to change its position never occurs.

Consequently, in the second embodiment, the arrangements of the gears 105, 107 and 108 are adjusted in order that the action lines 119 and 120 are approximately parallel. That is, when the input gear 105 has the number of teeth ZA of 19, the addendum modification coefficient XA of +0.3, and a pressure angle γA of 20°, the large diameter gear portion 107a of the transmission gear 107 has the number of teeth ZB of 28, the addendum modification coefficient XB of +0.75, and the pressure angle γB of 20°, and the large diameter gear portion 108a of the first output gear 108 has the number of teeth ZB of 18, the addendum modification coefficient XB of +0.9, and the pressure angle γB of 20°, respectively, the engagement pressure angle γAB of the input gear 105 with the transmission gear 107 is 26.4° and the engagement pressure angle γBC of the transmission gear 107 with the first output gear 108 is 28.9°. Here, assuming that an angle of the center line between the centers of the input gear 105 and the transmission gear 107 to that between the centers of the transmission gear 107 and the first output gear 108 is Ψ, when the following equations are satisfied, the action line 119 of the input gear 105 and the transmission gear 107 is approximately parallel with the action line 120 of the transmission gear 107 and the output gear 108.

$$\Psi+(90°-\gamma AB)+(90°-\gamma BC)=180°$$

$$\Psi=\gamma AB+\gamma BC=26.4°+28.9°=55.3°$$

Moreover, in order to release the engagement of the transmission gear 107 with the first output gear 108 by rotating the actuated lever 106 counterclockwise, the transmission gear must be permitted to shunt from the first output gear 108 without being interfered by the first output gear 108. The transmission gear 107 is rotated by the rotation force of the input gear 105. At this time, the quantity of rotation dζ of the transmission gear 107 is given by the following equation.

$$d\zeta=(ZA/ZB+1)\cdot d\theta$$

where dθ is a very small rotation angle of the actuated lever 106. Therefore, the angle β of the movement direction of the contact point of the transmission gear 107 and the output gear 108 relative to the reference line 122 (the straight line which is perpendicular to the line between the centers of the input gear 105 and the transmission gear 107 and passes through the gear shaft 105a of the input gear 105) is given by the following equation.

$$\beta=\tan-1(\sin \Psi/(\cos \Psi-1))$$

If the angle β is smaller than the angle of the tangent line 123 relative to the reference line 122, the tangent line 123 being the one of the transmission gear 107 with the first output gear 108, the transmission gear 107 never interferes with the first output gear 108.

In this embodiment, each of the gears 105, 107 and 108 is arranged such that the angle β is smaller than the angle α (α=63.6° and β=62.35°), thereby smoothly releasing the engagement of the transmission gear 107 with the first output gear 108.

Next, an example of application of the gear module 101 to a flexible disk drive will be described. In this example, a loading operation for the disk is carried out by utilizing the driving force of the second output gear 109 of the gear module 101. A releasing operation for the head protection member is carried out by utilizing the driving force of the first output gear 108 of the gear module 108. Here, the head protection member serves to allow a head to shunt from a disk, so that the head does not touch the disk. Moreover, the releasing operation for the head protection member is the one in which the head protection member is moved so as to release the shunt of the head and make the head freely movable.

Concretely, when a disk cartridge is first inserted to a driving apparatus, the disk is absorbed to the spindle motor by the well known chucking mechanism and an ejection spring is charged. In this state, since the actuator 113 is not energized, the transmission gear 107 and the second output gear 109 are engaged with each other as shown in FIG. 4. Subsequently, the driving motor 103 is driven in the positive direction, and the second output gear 109 is rotated via the worm gear 103a, the gear 104, the gear 105 and the transmission gear 107. By this rotation of the second output gear 109, an ejection member is set to a predetermined position in the state where the ejection spring is charged.

Thereafter, when the actuator 113 is energized, the power actuating lever 111 rotates clockwise around the gear shaft 109a in opposition to the coil spring 112, and the transmission gear 107 and the first output gear 108 are engaged with each other, whereby the engagement of them changes to the state of FIG. 5. In this state shown in FIG. 5, the driving motor 103 is driven in the reverse direction and the first output gear 108 is rotated, whereby the head protection member moves to release the shunt of the head. Thereafter, since the engagement state of the transmission gear 107 and the first output gear 108 is kept in spite of stopping application of the current to the driving motor 103, the head protection member remains in the state where it comes off from the head and the head keeps the state where it is able to contact the disk. Thus, the head comes to be movable, and data is enabled to be read out from the disk and written thereto.

Next, when supplying of the current to the actuator 113 is stopped, a VCM and the power actuating lever 111 rotate counterclockwise by a restoring force of the coil spring 112, so that the transmission gear 107 comes off from the first output gear 108. At this time, since the pushing force 117 of the input gear 105 applied to the transmission gear 107 cancels the pushing force 118 of the first output gear 108 applied thereto, no force to change the position of the transmission gear 107 acts on the gear 107. Therefore, the head protection member returns to the original position quickly, thereby shunting the head from the disk. Then, when the second output gear 109 connected to the driving motor 103 rotates by a specified quantity by the motor 103, the disk comes to separate from the spindle motor and, at the same time, the disk is ejected to the outside by the restoring force of the ejection spring.

If the supplying of the current to the actuator 113 is stopped, the transmission gear 107 is separated from the first output gear 108 by the energizing force of the coil spring 112, thereby making the first output gear 108 free. Therefore, the head protection member returns to the original position quickly, thereby shunting the head from the disk. As described above, since the head protection member first permits the head to shunt from the disk in spite of the power source being suddenly cut off by a stoppage of electric power and the like during accessing to the disk, it can be prevented the disk from being damaged.

The gear module of the second embodiment of the present invention is constructed as described above, so that the following effects can be achieved.

Since the gears are arranged so that the action line of the input gear and the transmission gear is approximately in parallel with that of the transmission gear and the output gear, the pushing force applied to the transmission gear by the input gear and the pushing force applied to the transmission gear by the output gear cancel each other. Therefore, a force to change the position of the transmission gear does not occur therein, so that the free end of the swing lever rotates in the direction opposite to the output gear simply by applying a small force to the swing lever. As a result, the engagement of the transmission gear and the output gear is smoothly released and an excessive load is never applied to the actuator for rotating the swing lever.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A gear module comprising:

an outputting gear pivotally fitted to a base;

a transmission gear rotated by a driving force from a driving motor to transmit the driving force to the outputting gear, a power actuating lever having a first rotational center pivotally fitted to said base to be rotated around the first rotational center and a second rotational center;

an actuated lever having a third rotational center pivotally fitted to said transmission gear and a fourth rotational center pivotally fitted to said base; and a connection bar rotatably connected around said second rotational center of said power actuating lever and said third rotational center of said actuated lever, said connection bar allowing said actuated lever to rotate in accordance with a rotation of said power actuating lever and allowing said transmission gear and said outputting gear to be engaged with each other, wherein said first, second and third rotational centers are substantially on a straight line when said transmission gear is engaged with said outputting gear.

2. The gear module according to claim 1, wherein said power actuating lever comprises:

an elastic member which energizes said power actuating lever in a gear releasing direction to separate said transmission gear from said outputting gear; and an actuator which rotates said power actuating lever in a direction opposite to the gear releasing direction in opposition to an energizing force of said elastic member, wherein when application of a current to the actuator is stopped, said power actuating lever is rotated by the energizing force of said elastic member in said gear releasing direction, thereby separating said transmission gear from said outputting gear.

3. The gear module according to claim 1, wherein said gear module comprises:

a second outputting gear which is pivotally fitted to said base and disposed in a direction opposite to said outputting gear with respect to said transmission gear, said second outputting gear being engaged with said transmission gear separated from said outputting gear, wherein said transmission gear is selectively engaged with either one of said outputting gear and with said second outputting gear in accordance with a rotation of said actuated lever.

* * * * *